Patented Jan. 30, 1951

2,539,766

UNITED STATES PATENT OFFICE 2,539,766

TRIAZINE BRIGHTENING AGENTS

Reinhard Zweidler and Heinrich Häusermann, Basel, Switzerland, assignors to J. R. Geigy A. G., Basel, Switzerland, a Swiss firm No Drawing. Application May 24, 1949, Serial No. 95,162. In Switzerland June 4, 1948

6 Claims. (Cl. 260—249.5)

The present invention is concerned with the manufacture of new brightening agents for protein fibres in general and for wool in particular. The new brightening agents or optical bleaching agents are especially suitable for wool which has been first bleached chemically and still has a faintly yellowish appearance. As compared with known optical bleaching agents for wool the compounds of the invention are distinguished by better fastness properties.

Compounds belonging to the most varied chemical classes have already been proposed for use as optical bleaching agents, including, among others, derivatives of 4:4'-diamino-stilbene-2:2'-disulfonic acid, some of which have become of considerable importance. Thus, by reacting the latter acid with 2 mol of cyanuric halide and replacing the remaining halogen atoms by amino groups, optical bleaching agents have been produced having an intense blue fluorescence and a markedly substantive character, which makes them eminently suitable for brightening cellulose fibres. Such products, however, are little suited for wool, for which because of their strongly substantive nature they have very little affinity. A 4'-acetylamino-2:2'-disulfo-stilbenyl-ammeline compound is also already known, although its use has not been precisely indicated. Our experiments have shown that this compound likewise exhibits insufficient affinity for wool. Because of inadequate drawing-power a satisfactory brightening effect cannot be produced with it, for even an increase in concentration does not result in an improvement of the brightening effect. Furthermore, the dyeings thus obtained have such a reddish tint that any practical use of this compound for brighening wool is out of the question.

The surprising discovery has now been made, that melamine derivatives of the general formula:

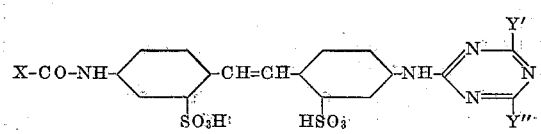

wherein

X denotes a lower alkyl or alkoxy radical,
Y' and Y'' denote the primary amino group or secondary or tertiary amino groups, have a much better affinity towards protein fibres, so that some of them can even be used for dyeing from a neutral or weakly acid bath. Such dyeings are distinguished by a good brightening effect, as well as good fastness properties towards acid, laundering and sea-water. The new products have better fastness to alkalis and superior drawing power from a neutral dyebath as compared with the sulfonated 4:5-diphenyl-imidazolones, which although completely different chemically, are the only brightening agents for wool so far in practical use. Consequently the new agents represent a valuable technical advance.

The new melamine derivatives of the above formula can be prepared by various methods: Thus 1 mol of 4-nitro-4'-aminostilbene-2:2'-disulfonic acid can first be condensed by methods known per se with 1 mol of a reactive 2:4:6-trihalogen-1:3:5-triazine compound, i. e., with cyanuric chloride or bromide. The remaining halogen atoms in the condensation product can be then replaced in stages by the radicals of ammonia, of primary or secondary lower aliphatic amines which may also contain the usual substituents in the alkyl group, such as, e. g., hydroxyl groups, of cycloalkylamines, aralkylamines and of primary or secondary aromatic amines of the benzene series which may contain non-auxochromic substituents usual in azo dyestuffs, such as, e. g., halogen, methyl, methoxy, ethoxy, acylamino, carboxyl or sulfonic acid amide groups, and which amines may be alkylated, aralkylated or cycloalkylated.

The same nitrostilbenyltriazine compounds can, however, also be produced if a water-soluble aromatic amine of the benzene series, for example sulfanilic or metanilic acid is condensed with cyanuric chloride or bromide, then treated with 1 mol of 4-nitro-4'-aminostilbene-2:2'-disulfonic acid, and, finally, the remaining halogen atom reacted with one of the amines defined above. The nitro-stilbenyl-melamine derivatives so obtained are then reduced to the corresponding aminostilbenyl melamine derivatives by the usual methods, for example, with iron filings and acid, and the amino compound finally acylated with reactive derivatives of lower fatty acids or with lower esters of halogeno-formic acid.

Another method starts from 4:4'-diaminostilbene-2:2'-disulfonic acids monoacylated with lower fatty acids or with lower halogen-formic acid esters. It consists in condensation with 1 mol of cyanuric halide and in the replacement of the remaining halogen atoms by the radicals of the amino compounds enumerated above. Naturally the monoacyl-4:4'-diaminostilbene-2:2'-disulfonic acid can also be condensed with one mol of a water soluble condensation product of an aromatic amine with cyanuric halide and the remaining halogen atom then replaced by one of the amino compounds defined above.

As may be gathered from the foregoing, the melamine derivatives according to the invention can have the same or different amino radicals in the $Y_1$ and $Y_2$ positions.

Furthermore, the aliphatic amine radicals may be substituted in the alkyl radical, preferably by the hydroxyl group. Mono-ethanolamine, diethanolamine, 2:3-dihydroxypropylaminepropylamine and the like can be used for condensation. However, hydroxy-alkyl groups can also be introduced subsequently by condensing the primary amino group by methods known per se with lower aldehydes, preferably with formaldehyde, resulting in the formation of methylolamino groups.

The following examples further illustrate and explain the method of manufacture and the use of the new optical bleaching agents for wool without restricting the invention in any way. Except where otherwise stated, parts are by weight and temperatures are centigrade. The relationship of parts by weight to parts by volume is that of kilogram to litre.

*Example 1*

18.5 parts of cyanuric chloride are condensed at 0–4° with an aqueous solution of 41.2 parts of 4-amino-4'-acetylaminostilbene-2:2' - disulfonic acid. The two remaining halogen atoms of the 1:3:5-triazine ring are replaced by treatment with 21.4 parts of methylaniline in weakly acid solution, first at 20–22° and then at 90–95°. The compound formed is salted out and separated. If necessary, it is purified by re-precipitation, whereby agents may be used capable of adsorbing or destroying faintly coloured by-products. After drying, the compound thus obtained is a faintly yellowish powder which draws from an aqueous, weakly acid or neutral bath on to wool, to which it gives a pure white appearance, especially when the wool has already been bleached. The fastness of the brightening effect to water and to laundering is satisfactory. It has also good fastness to light and excellent fastness to acids and alkalis.

The same compound may also be prepared as follows: Cyanuric chloride is reacted with 4:4'-nitroaminostilbene-2:2'-disulfonic acid and then with methylaniline under the above conditions. After reduction with iron and hydrochloric acid by the Béchamp method, the reaction product is acetylated in aqueous solution with acetic anhydride.

Products of quite similar properties may be prepared by reacting in analogous manner the condensation product from 4-amino-4'-acetylamino-stilbene-2:2'-disulfonic acid and cyanuric chloride with 21.4 parts of methylaniline or with 19.8 parts of cyclohexylamine.

*Example 2*

The primary 1:3:5-triazine compound from 18.5 parts of cyanuric chloride and 41.2 parts of 4-amino-4'-acetylamino-stilbene-2:2'-disulfonic acid is treated with 17.3 parts of metanilic acid at 20–25° and then with 14 parts of 25% ammonia at 90–95°. The end product is isolated and purified. When dry, it is a faintly yellowish powder, a neutral or weakly acid aqueous solution of which gives pre-bleached wool a whiter appearance.

By treating the substance described above with formaldehyde, e. g., according to the process of British Patent No. 595,065 a product can be obtained whose properties are improved as compared with the non-formylated compound. Wool treated with this compound shows a brightening effect with good fastness to laundering and water, very good fastness to acids and alkalis as well as good fastness to light.

Alternatively 69.75 parts of the secondary condensation product from cyanuric chloride, 4:4'-aminoacetylaminostilbene - 2:2'-disulfonic acid and metanilic acid may be treated with, e. g., 9.3 parts of aniline instead of with ammonia. The compound so produced shows a good brightening effect on wool with good fastness properties throughout. The order of introduction of the metanilic acid and aniline can be readily changed so that the first condensation is with aniline, followed by that with metanilic acid.

*Example 3*

56.0 parts of the primary condensation product from cyanuric chloride and 4:4'-aminoacetylaminostilbene-2:2'-disulfonic acid are reacted first with 9.3 parts of aniline and then with 14 parts of 25% ammonia. When pure, the end product obtained is a faintly yellowish powder suitable for brightening wool. This brightening effect exhibits, besides good fastness to water and laundering, good fastness to light, excellent fastness to sea-water and good fastness to alkalis and acids.

If the aniline in the secondary condensation product is replaced, for example, by 10.7 parts of methylaniline and the third halogen atom of the 1:3:5-triazine compound replaced by ammonia then the product is excellently suited for use as a brightening agent for wool.

All these products are faintly yellowish powders which dissolve readily in water and can be used with good effect from an acid or neutral bath for brightening wool and silk.

Products of similar properties are obtained when one halogen atom of the primary condensation product is reacted with 10.7 parts of benzylamine, 12.1 parts of phenylethylamine, 9.9 parts of cyclohexylamine or 11.3 parts of p-methylcyclohexylamine and the second halogen atom is reacted with ammonia.

*Example 4*

18.5 parts of cyanuric chloride are condensed with 41.2 parts of 4-amino-4'-acetylaminostilbene-2:2'-disulfonic acid as described in Example 1. The further steps in the condensation follow first at 20–22° and then at 90–95° with 28 parts of 25% ammonia. After isolation and purification the compound obtained is, when dry, a faintly yellowish powder.

The 1:3:5-triazine derivative can be reacted with formaldehyde according to the process of British Patent No. 595,065, for example. The product is a very good brightening agent for wool, exhibiting excellent fastness properties towards water, laundering, acids and alkalis and having also good fastness to light.

Quite similar active products are obtained when the two halogen atoms of the primary condensation product are reacted with dimethylamine or diethanolamine instead of with ammonia. These compounds show a very fine whitening effect on wool.

*Example 5*

18.5 parts of cyanuric chloride are treated in aqueous solution with 42.6 parts of 4-amino-4'-propionylaminostilbene - 2:2' - disulfonic acid.

After the reaction is over the second halogen atom of the 1:3:5-triazine ring is replaced by reaction with aniline and the third halogen atom by reaction with ammonia. The end product is isolated and dried. It is a faintly yellowish powder which is well suited by its properties for use as a brightening agent for wool.

*Example 6*

54.8 parts of the nitro compound which can be prepared by condensing 40 parts of 4:4'-nitroaminostilbene-2:2'-disulfonic acid with 18.5 parts of cyanuric chloride as described in U. S. Patent 2,368,844 are reacted in aqueous solution first at 20-25° with 17.3 parts of metanilic acid and then at 90-95° with 9.3 parts of aniline. The reaction product is reduced with iron filings and hydrochloric acid by the Béchamp method and the compound so obtained treated with 12 parts of methyl chloroformate, while stirring well at room temperature, in aqueous solution in the presence of a mineral acid binding agent such as, e. g., sodium acetate. After the reaction is over the compound is salted out and isolated. The product is a faintly yellowish powder. When used in a weakly acid bath it gives wool a beautiful white appearance in daylight. The same compound can also be prepared by condensing cyanuric chloride with 4-amino-4'-carbomethoxyaminostilbene-2:2'-disulfonic acid, metanilic acid and aniline. It has the same properties as described above.

Instead of 12 parts of methyl-chloroformate 13.8 parts of ethyl-chloroformate may be used in the above examples.

*Example 7*

41.2 parts of 4-amino-4'-acetylaminostilbene-2:2'-disulfonic acid are reacted with 18.5 parts of cyanuric chloride as described in Example 1. The dichloro-triazyl derivative obtained is agitated under reflux for 7 hours at 95-100° with 27.2 parts of crystalline sodium acetate and 42.8 parts of o-toluidine. Next, 10.6 parts of anhydrous sodium carbonate are added and the excess o-toluidine is removed by steam-distillation. The remaining solution is filtered hot and the product isolated by salting-out with common salt. After drying, a yellowish powder is obtained whose aqueous solution is very well suited for giving a white appearance to yellowish wool. The product has the advantage of possessing very good affinity for wool even in a neutral or weak acetic acid bath.

The same product is also produced when the primary condensation product from 40 parts of 4-nitro-4'-aminostilbene-2:2'-disulfonic acid and 18.5 parts of cyanuric chloride is treated in the same way with 42.8 parts of o-toluidine, the nitro group subsequently reduced by the Béchamp method and the amino compound obtained acetylated with an acetylating agent.

Products with quite similar properties are obtained if 51 parts of o-chloraniline or 49.2 parts of o-anisidine are used instead of 42.8 parts of o-toluidine.

*Example 8*

10 grams of bleached wool yarn of a slightly yellowish appearance are dyed for 30 minutes at 40-50° in a bath with a liquor ratio 1:30 containing 0.1 g. of the brightening agent according to Example 1, 1 g. Glauber's salt and 0.2 g. of 80%-acetic acid. The wool is then rinsed with cold water and air-dried. Yarn treated in this way has a much whiter appearance than the untreated material. The effect produced is fast to water and laundering.

What we claim is:

1. A brightening agent comprising a compound of the formula

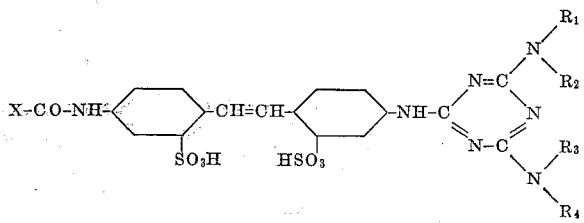

wherein X represents a member selected from the group consisting of lower alkyl and lower alkoxy radicals, and each of $R_1$, $R_2$, $R_3$ and $R_4$ represents a member of the group consisting of H, alkyl, hydroxyalkyl, phenylalkyl, alkylphenyl, sulfophenyl, lower alkoxyphenyl and chlorophenyl, the alkyl being lower alkyl throughout.

2. A brightening agent comprising a compound of the formula

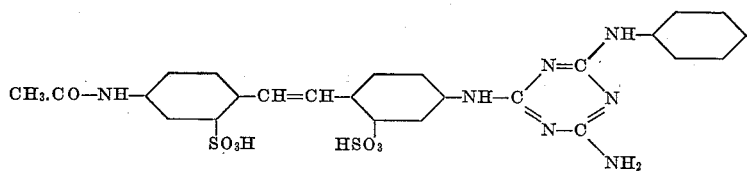

3. A brightening agent comprising a compound of the formula

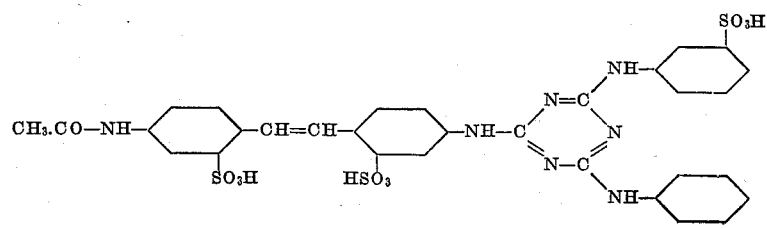

4. A brightening agent comprising a compound of the formula

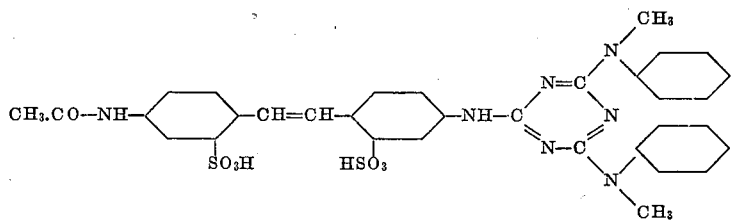

5. A brightening agent comprising a compound of the formula

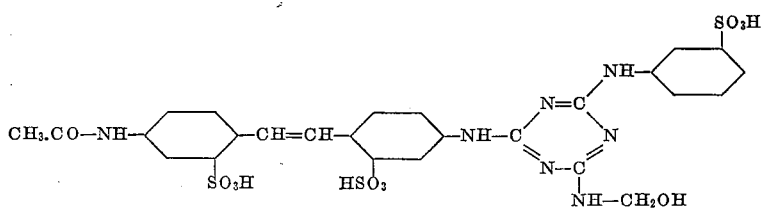

6. A brightening agent comprising a compound of the formula

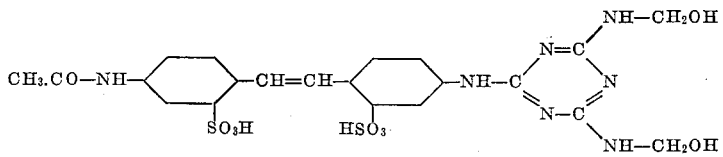

REINHARD ZWEIDLER.
HEINRICH HÄUSERMANN.

REFERENCES CITED

The following references are of record in the file of this patent:

UNITED STATES PATENTS

| Number | Name | Date |
|---|---|---|
| 2,368,444 | Keller | Feb. 6, 1945 |
| 2,376,743 | Wendt | May 22, 1945 |

FOREIGN PATENTS

| Number | Country | Date |
|---|---|---|
| 55,370 | Netherlands | 1943 |

OTHER REFERENCES

PB 716, Office of Technical Services, Dept. of Commerce, 4 pp.